May 29, 1945.    C. E. FRASER    2,377,139
NOTCHING MACHINE
Filed July 9, 1943    5 Sheets-Sheet 3

INVENTOR
CHARLES ERIC FRASER
BY:-
ATTORNEYS

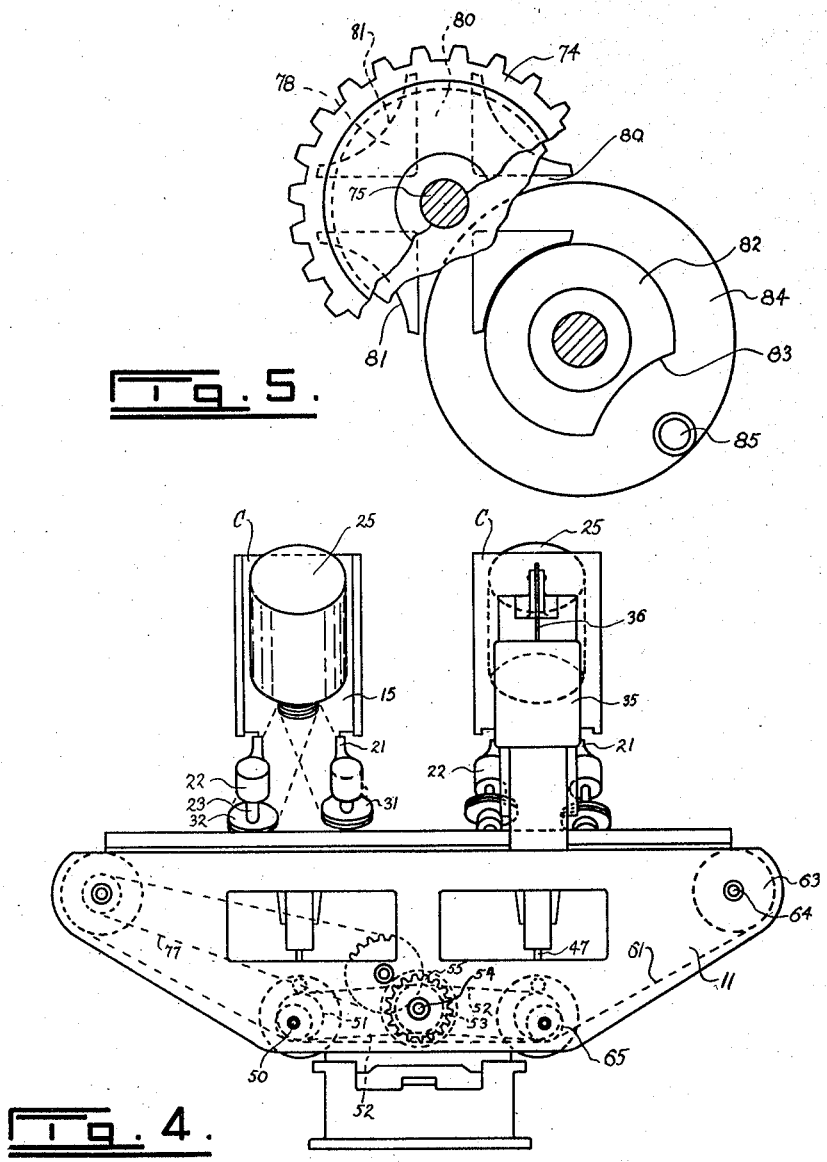

May 29, 1945.  C. E. FRASER  2,377,139
NOTCHING MACHINE
Filed July 9, 1943          5 Sheets-Sheet 5
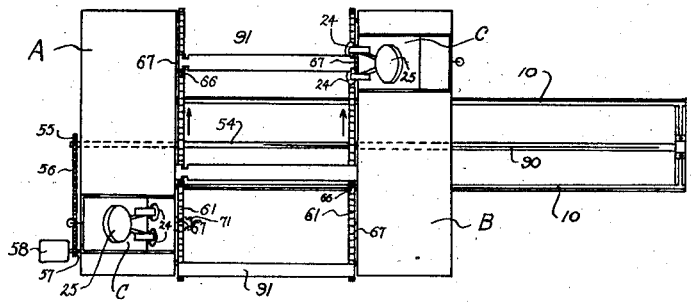
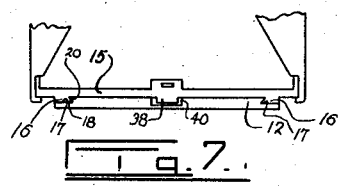
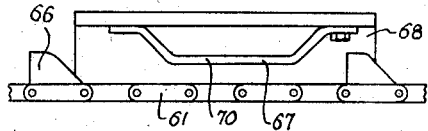
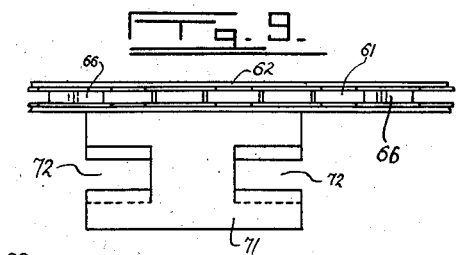
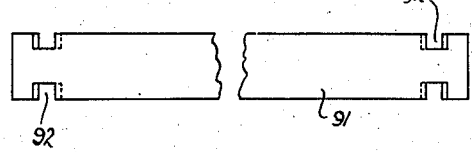
INVENTOR
CHARLES ERIC FRASER
BY
*Fetherstonhaugh & Co*
ATTORNEYS.

Patented May 29, 1945

2,377,139

UNITED STATES PATENT OFFICE 2,377,139

NOTCHING MACHINE

Charles Eric Fraser, Vancouver, British Columbia, Canada

Application July 9, 1943, Serial No. 494,051
In Canada April 12, 1943

6 Claims. (Cl. 144—133)

This invention relates to a machine for cutting one or more notches in the edges of boards.

An object of the present invention is the provision of a machine for cutting one or more angularly arranged notches in the edges of boards.

Another object is the provision of a machine for continuously and rapidly notching boards.

Another object is the provision of a machine for notching one or both edges of a board at both ends thereof.

A further object is the provision of a notching machine capable of handling boards of different lengths.

A still further object is the provision of a machine for notching boards in an efficient and satisfactory manner.

Figure 1:
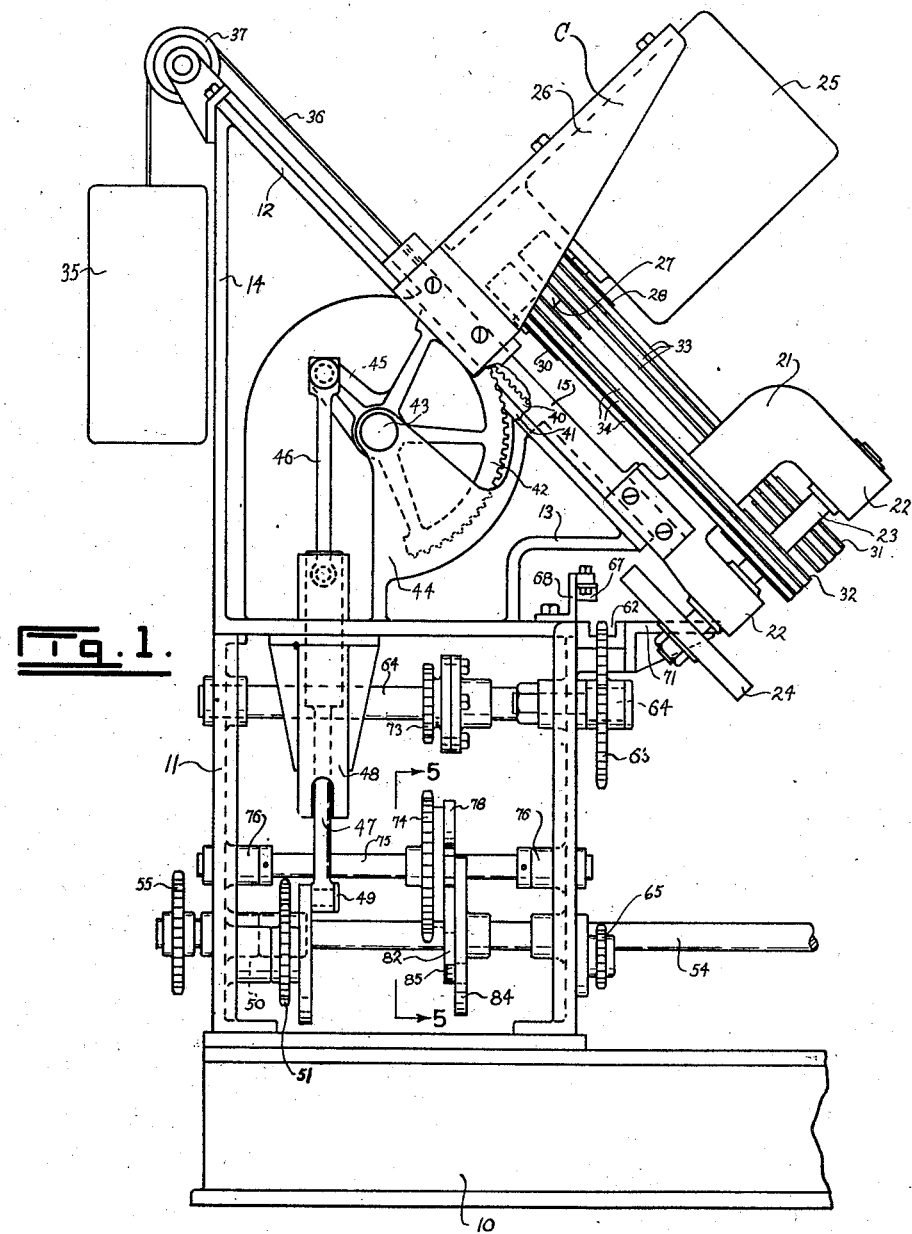
Figure 2:
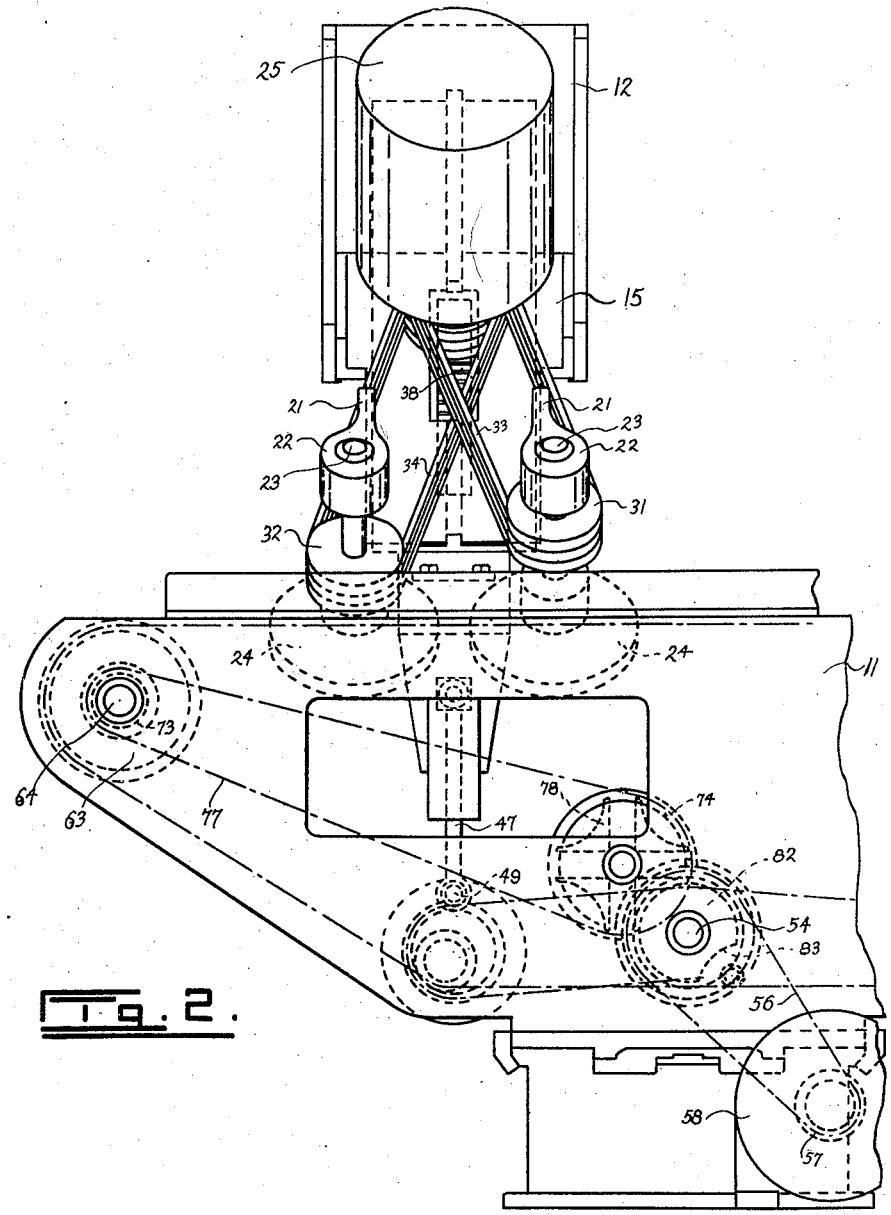
Figure 3:
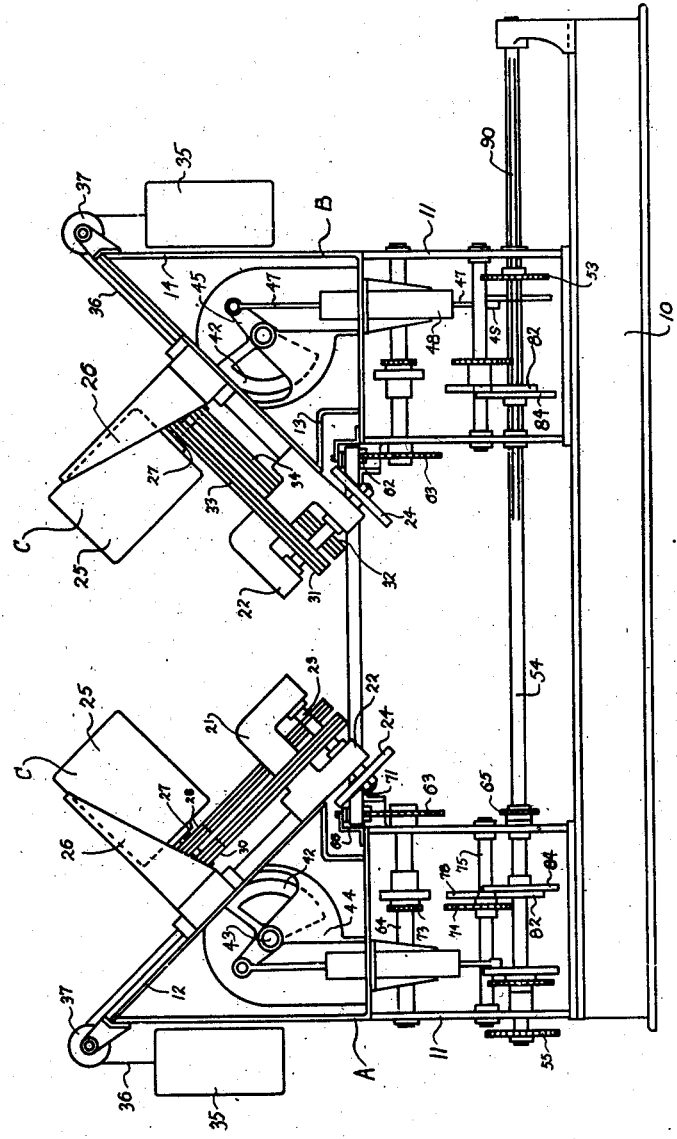

With these and other objects in view, the present invention consists essentially of a machine for notching the edges of boards comprising a bed plate, a cutter head movably mounted on said plate, means for rotating the head at high speed, means for retaining a board beneath the head, and means for moving the rotating head past an edge of the board to cut a notch therein, as more fully described and illustrated by way of example in the following specification and the accompanying drawings in which, Figure 1 is a fragmentary end elevation of the machine, Figure 2 is a fragmentary side elevation of one end of the machine, Figure 3 is a reduced end elevation of the complete machine, Figure 4 is a side elevation with certain details omitted for the sake of clarity, Figure 5 is an enlarged sectional view taken substantially on the line 5—5 of Figure 1, Figure 6 is a reduced plan view, Figure 7 is a detail end view of the bed plate, Figure 8 is an enlarged view of a clamp used in the machine, Figure 9 is a plan view of a die plate of the machine, and Figure 10 is a view of a finished board with notches cut in its edges.

Referring more particularly to Figure 6, the machine consists of two identical sections A and B, each having a cutting arrangement C mounted thereon. The section A is permanently mounted on a bed formed of rails 10, while the section B is slidably mounted thereon. As the sections are the same, only one, A for example, will now be described in detail.

The section includes a frame 11 of any desired shape and construction, upon the top of which a bed plate 12 is mounted at an angle of substantially 45 degrees or at any other required angle. The inner or lower end of this plate is carried by a support 13 centrally thereof, while its outer or upper end rests upon a support 14, said supports being carried by the frame. The cutting arrangement C is slidably mounted on the plate 12.

A base plate 15 is slidably mounted on the bed plate 12 in any suitable manner, such as by means of rails 16, see Figure 7, at each side of the base slidably fitting within recesses 17 formed in the bed at its sides. The rails are formed with inner projections 18 which fit beneath corresponding ledges 20 on the base side ledges extending over the recesses 17. The base 15 is much shorter than the bed 12.

A pair of brackets 21 are mounted at the bottom of the plate 15, one at each corner thereof, see Figures 1, 2 and 3, and each bracket has spaced projecting bearings 22 in which a shaft 23 is journalled and retained substantially at right angles to the plate beyond the end thereof. A cutter head 24 of suitable design is fixed to the lower end of the shaft 23 and lies in approximately the same plane as the base plate.

A suitable source of power, such as an electric motor 25, is carried by a support 26 projecting outwardly from the upper end of the plate 15, and its power shaft 27, Figures 1 and 3, extends downwardly therefrom. A suitable driving connection is provided between the power shaft and both shafts 23. In this example, pulleys 28 and 30 are mounted on the shaft 27, and corresponding pulleys 31 and 32 mounted on the shafts 23 between their bearings 22 are connected to the pulleys 28 and 30 by means of V-belts 33 and 34 respectively.

A counterweight 35 is connected by a chain or cable 36 to the upper end of the base plate 15. The chain or cable extends over a pulley 37 which is mounted at the upper end of the bed plate 12, so that the counterweight is suspended behind the cutting arrangement A.

The cutting arrangement is reciprocated on the bed plate in any suitable manner. In this example, a rack 38 is formed on and extends longitudinally of the base 15 substantially centrally thereof. This rack freely extends into a central longitudinal slot 40 formed in the bed 12, see Figure 7. At approximately the middle of the slot, the bed is cut away to form an opening 41, Figure 1, through which a segment gear 42 extends to mesh with the rack 38. This gear is mounted beneath the base on a shaft 43 carried by a standard 44 which, in turn, is situated on the top of the frame 11. An arm 45 is connected to the gear 42 and projects outwardly therefrom on the opposite side of the shaft 43. A connecting link 46 is pivotally connected at its upper and lower ends to the arm 45 and to a pitman 47, respectively, said pitman operating in a guide 48 carried by the frame 11. The lower end of the pitman is pivotally connected to a crank 49 mounted on a shaft 50 on which a sprocket 51 is mounted. The shaft 50 is supported by the frame 11. A chain 52 connects the sprocket 51 to another sprocket 53, mounted on a shaft 54, said shaft having a sprocket 55 outside the frame which is connected by a chain 56 to a sprocket 57 on the drive shaft of a motor 58.

An endless chain 61 running through a trough 62 lying substantially parallel to the upper inner edge of the frame 11, extends around sprockets 63 mounted on shafts 64 at opposite ends of the frame and around idler sprockets 65 located near the bottom of the frame adjacent its opposite ends. A plurality of equally spaced lugs 66 are mounted on the chain 61 and project outwardly therefrom. At a point beneath each cutting arrangement C approximately midway between its cutter heads 24, a clamp 67 is mounted on the frame 11 by a bracket 68, see Figures 1 and 8. This clamp consists of a substantially U-shaped strap 70, the bottom of which is spaced a predetermined distance above the trough 62. Another similar clamp 67 is situated in the frame at a point spaced from the first-mentioned one and opposite the cutting arrangement of the other section.

A die plate 71 (Figure 9) is mounted on the side of the trough 62 opposite the clamp 67, with its surface flush with the top of the trough. This plate has opposed recesses 72 in its opposite side and these recesses extend therethrough at an angle so that they extend in the same plane and in line with the cutter heads 24, there being one recess for each head.

The chain 61 is intermittently moved around its sprockets in any suitable manner. For example, a sprocket 73 is mounted on one of the shafts 64, and another sprocket 74 is mounted on a shaft 75 journalled in bearings 76 carried by the frame 11. The sprockets 73 and 74 are connected by a chain 77, see Figures 2 and 4. A Geneva wheel 78 (Figure 5) mounted on the shaft 75 has the usual radiating slots 80 therein with arcuate recesses 81 formed in its periphery between the ends of the slots. A disc 82 is mounted on the shaft 54 and has an arcuate recess 83 in its periphery. The radius of the curve of each recess 81 is equal to the radius of the disc 82, and the radius of the curve of the recess 83 is equal to that of the Geneva wheel. The shafts 54 and 75 are so located in relation to each other that the periphery of the disc 82 bears against the bottom of a recess 81 in order to hold the wheel stationary. A larger disc 84 is mounted on the shaft 54 against the disc 82 and the former has a pin 85 adjacent its periphery projecting outwardly over the recess 83. As the disc 84 is rotated, this pin is adapted to enter a slot 80 to turn the wheel a quarter turn. During this movement, the periphery of the wheel at the outer end of the slot in which the pin is located, extends into the recess 83. As a result of this, for every revolution of the shaft 54 and the disc 84, the Geneva wheel and the shaft 75 are turned a quarter turn. This movement is transferred to the shaft 64 and, consequently, the chain 61 is moved a predetermined distance.

When the motor 58 is set in operation, the shaft 54 and the sprocket 55 are rotated. The chain 52 causes the sprocket 51 and, consequently, the crank 49 to turn. The rotation of this crank reciprocates the pitman 47 and the line 46, causing the gear 42 to move back and forth about its shaft 43. As the gear meshes with the rack 38 in the bottom of the base plate 15, the latter is reciprocated on the bed plate 12 carrying with it the cutter heads 24 and their associated elements. The movement of the base plate is such that the cutter heads move downwardly part way through the recesses 72 of the die plate 71 and move upwardly sufficiently to clear the die plate by a considerable margin. The motor 25 rotates the cutter heads at high speed.

The rotation of the shaft 54 also turns the discs 82 and 84 which, in turn, intermittently rotate the Geneva wheel 78 with the consequent intermittent movement of the chain 61, as described above. The disc 82 retains the Geneva wheel stationary while the periphery of the former remains in a recess 81 of the latter. The movement of the chain 61 is timed to take place when the cutter heads are well above the die plate 71. This chain remains stationary as the cutter heads move downwardly towards and into the recesses 72 and back well clear of the die plate.

By referring to Figure 6, it will be seen that the shaft 54 extends inwardly beyond the frame of the section A and through the frame of the section B. The shaft is formed with splines 90 adjacent the section B and the discs 82 and 84 of the latter are slidably mounted on the splined section of the shaft. With this arrangement, the elements of section B operate exactly the same as the corresponding elements of section A, but all from the same motor 58. Section B may be moved towards and away from section A. It will be noted that the cutting arrangements C are staggered in relation to each other, but it is to be understood that they may be directly opposed, if desired.

Although this machine is designed to handle a steady stream of boards, its operation will now be described in connection with one board only. A board 91 is placed with its ends on the opposite chains 61. As the chains move in the same direction, see the arrows in Figure 6, the board is moved beneath the cutter heads 24 of the section A by the lugs 66 of the chains. The ends of the board are located beneath the clamps 67 of the opposite sections and one end of said board lies over the die plate 71. At this point, the board is stationary and the cutter heads moving downwardly cut through both edges of the board at an angle to form angularly arranged notches 92. The bottoms of the straps 70 of the clamps bear against the board to retain it in place while it is being cut. After the cutter heads have risen, the board is moved away therefrom. Eventually, the board arrives beneath the cutter heads of section B where the same action takes place at the opposite end of the board to cut a pair of notches 92 therein. Thus both ends of the board are notched.

The section B may be moved towards or away from the section A in order to accommodate boards of different lengths. It will be understood, however, that the cutting arrangement C and its associated mechanism may be omitted from either section, so that one end only of the board will be notched as it passes through the machine.

In this event, the board could be passed through the machine twice if it were necessary to notch both ends. It will further be understood that one or both cutting arrangements C may have only one cutter head if it is desired to notch only one edge of the board at either or both ends.

Various modification may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. A machine for notching the edges of boards comprising a bed plate lying at an angle to the horizontal, a base plate slidable on the bed plate, a pair of spaced cutter heads mounted on the base plate side by side in the same plane, said heads being movable together in a plane parallel with the bed plate and having cutting portions which are spaced apart less than the width of the board to be notched, means for rotating the heads at high speed, a die plate mounted beneath the heads and having recesses in its opposite edges in line with the heads, means for holding a board on the die plate, and means for moving the rotating heads past opposite edges of the board and through the recesses to cut a notch in each edge of the board.

2. A machine for notching the edges of boards comprising a bed plate lying at an angle to the horizontal, a base plate slidable on the bed plate, a pair of spaced cutter heads mounted on the base plate side by side in the same plane, said heads being movable together in a plane parallel with the bed plate, and having cutting portions which are spaced apart less than the width of the board to be notched, means for rotating the heads at high speed, a die plate mounted beneath the heads and having recesses in its opposite edges in line with the heads, means for intermittently moving a board under the cutter heads and over the die plate, said means stopping momentarily when the board is beneath the heads, means for holding the boards on the die plate, and means for moving the rotating heads past opposite edges of the board and through the recesses when said board is stationary to cut a notch in each edge thereof.

3. A machine for notching the edges of boards comprising a bed plate lying at an angle to the horizontal, a base plate slidable on the bed plate, a pair of spaced cutter heads mounted on the base plate side by side in the same plane, said heads being movable together in a plane parallel with the bed plate and having cutting portions which are spaced apart less than the width of the board to be notched, means for rotating the heads at high speed, a die plate mounted beneath the heads and having recesses in its opposite edges in line with the heads, a clamp above the die plate under which the end of the board extends when on said plate, and means for moving the rotating heads past opposite edges of the board and through the recesses to cut a notch in each edge of the board, said clamp retaining the board in position during this operation.

4. A machine for notching the edges of boards comprising two spaced frames, an endless chain extending around sprockets located at the inner end of each frame, said chains having parallel horizontal runs at the tops of the frames, opposed lugs on the chains for moving boards which are placed thereon, means for intermittently moving the chains around the sprockets, and a cutting arrangement on each frame; each cutting arrangement consisting of a bed plate mounted above its frame at an angle to the horizontal, a base plate slidable on the bed plate, a pair of spaced cutter heads mounted on the base plate side by side in the same plane, said heads being movable together in a plane parallel with the bed plate and having cutting portions which are spaced apart less than the width of the board to be notched, means in the base plate for rotating the cutter heads at high speed, and means for moving the rotating heads past opposite edges of a board on the chains when the latter are stationary to cut a notch in each edge.

5. A machine for notching the edges of boards comprising two spaced frames, an endless chain extending around sprockets located at the inner end of each frame, said chains having parallel horizontal runs at the tops of the frames, opposed lugs on the chains for moving boards which are placed thereon, means for intermittently moving the chains around the sprocket, and a cutting arrangement on each frame, a die plate beneath each cutting arrangement and having recesses in its opposite edges; each cutting arrangement consisting of a bed plate mounted above its frame at an angle to the horizontal, a base plate slidable on the bed plate, a pair of spaced cutter heads mounted on the base plate side by side in the same plane, said heads being movable together in a plane parallel with the bed plate and having cutting portions which are spaced apart less than the width of the board to be notched, means on the base plate for rotating the cutter heads at high speed, and means for moving the rotating heads past opposite edges of a board on the chains and through the recesses of the die plate under the arrangement to cut a notch in each edge of the board.

6. A machine for notching the edges of boards comprising two spaced frames, an endless chain extending around sprockets located at the inner end of each frame, said chains having parallel horizontal runs at the tops of the frames, opposed lugs on the chains for moving boards which are placed thereon, means for intermittently moving the chains around the sprockets, and a cutting arrangement on each frame, a die plate beneath each cutting arrangement and having recesses in its opposite edges, a clamp above each die plate under which the ends of the boards extend when on the die plate; each cutting arrangement consisting of a bed plate mounted above its frame at an angle to the horizontal, a base plate slidable on the bed plate, a pair of spaced cutter heads mounted on the base plate side by side in the same plane, said heads being movable together in a plane parallel with the bed plate and having cutting portions which are spaced apart less than the width of the board to be notched, means on the base plate for rotating the cutter heads at high speed, and means for moving the rotating heads past opposite edges of a board on the chains and through the recesses of the die plate under the arrangement to cut a notch in each edge of the board, said clamps retaining each board in position during this operation.

CHARLES ERIC FRASER.